United States Patent [19]

Carnis et al.

[11] Patent Number: 5,755,444
[45] Date of Patent: May 26, 1998

[54] LIPPED SEALING RING HAVING WAX PACKED IN HELICAL GROOVES TO FACILITATE TESTING UPON INSTALLATION

[75] Inventors: Patrick Carnis, Langres; Gilbert Pataille, Corlee, both of France

[73] Assignee: Carl Freudenberg, Weinheim, Germany

[21] Appl. No.: 711,734

[22] Filed: Sep. 5, 1996

[30] Foreign Application Priority Data

Sep. 5, 1995 [DE] Germany .................. 195 32 701.2

[51] Int. Cl.⁶ ........................... F16J 15/32; F16J 15/54
[52] U.S. Cl. ................................... 277/9; 277/152
[58] Field of Search ......................... 277/9, 152, 153, 277/DIG. 6

[56] References Cited

U.S. PATENT DOCUMENTS

| | | | |
|---|---|---|---|
| 2,488,465 | 11/1949 | Bourne, Jr. | 277/152 |
| 2,804,325 | 8/1957 | Riesing | 277/153 |
| 3,834,717 | 9/1974 | Broad | 277/153 |
| 3,929,341 | 12/1975 | Clark | 277/152 |
| 3,941,393 | 3/1976 | Bainard | 277/153 |
| 4,126,320 | 11/1978 | Pendleton | 277/152 |
| 4,230,157 | 10/1980 | Larsen et al. | 277/207 A |
| 5,015,001 | 5/1991 | Jay | 277/152 |
| 5,265,890 | 11/1993 | Balsells | 277/163 |
| 5,501,469 | 3/1996 | Ducugnon et al. | 277/153 |
| 5,544,895 | 8/1996 | Heine et al. | 277/152 |

FOREIGN PATENT DOCUMENTS

| | | | |
|---|---|---|---|
| 4307964 | 9/1994 | Germany | 277/152 |
| 0157877 | 7/1986 | Japan | 277/152 |
| 2173264 | 10/1986 | United Kingdom | 277/152 |
| 2203502 | 10/1988 | United Kingdom | 277/152 |
| 2258275 | 2/1993 | United Kingdom | 277/152 |

*Primary Examiner*—William A. Cuchlinski, Jr.
*Assistant Examiner*—John L. Beres
*Attorney, Agent, or Firm*—Furgang & Milde, LLP

[57] ABSTRACT

A lipped sealing ring for a mechanical component that moves relatively to it. The lip is of a polymeric material, is flexible, and is forced subject to resilient compression against the component in the vicinity of a sealing gap. A helical shoulder extends longitudinally and at an acute angle to the axis of the component through at least one point along the circumference of the gap. The sealing gap is packed with wax at least in the vicinity of the helical shoulder.

6 Claims, 1 Drawing Sheet

LIPPED SEALING RING HAVING WAX PACKED IN HELICAL GROOVES TO FACILITATE TESTING UPON INSTALLATION

BACKGROUND OF THE INVENTION

The present invention concerns a lipped sealing ring for a mechanical component that moves relatively to it. The lip is of a polymeric material and is flexible. It is forced subject to resilient compression against the mechanical component in the vicinity of a sealing gap. A helical shoulder extends longitudinally and at an acute angle to the axis of the component through at least one point along the circumference of the gap.

A sealing ring of this type is known from U.S. Pat. No. 3,985,487. It is intended for sealing a rotating shaft. Its lip is a flat annular disk of PTFE. Its inside circumference curves forward like the bell of a trumpet. The bell faces the interior being sealed off when the machinery is in normal operation. The bell's inner surface is forced subject to resilient tension against the surface of the shaft. It is provided with a helical shoulder that constitutes part of a twist groove. When the ring is mounted against the surface of a rotationally symmetrical shaft, space is left in the vicinity of the groove. The interior can communicate with the environment through the space. The, purpose of the space is to allow any fluid leaking through the sealing gap to be returned to the interior by the hydrodynamic forces that occur as the shaft rotates. The helical shoulder accordingly slopes at an acute enough angle to the axis of the shaft to ensure that the fluid will be hurled back toward the space.

The known lipped sealing ring is often mounted with automatic machinery. Sometimes the lip is unpredictably turned inside out, so that the bell faces the exterior instead of the interior as intended. The result, of course, is an unsatisfactory seal. It is accordingly necessary to inspect every single ring as soon as it has been installed to make sure that the bell is facing in the right direction. This is difficult to do with the naked eye when the site of installation is not easy to see. It is consequently conventional to fill the interior with compressed air subject to a specific pressure and measure the decrease in pressure over a specific time. A very rapid decrease definitely indicates that the ring is inside out and cannot provide a seal relative to the surface of the shaft as necessary.

Compressed air, however, is not particularly effective for testing the position of lipped sealing rings wherein a helical shoulder extends longitudinally and at an acute angle to the axis of the moving mechanical component through at least one point along the circumference of the gap.

SUMMARY OF THE INVENTION

The principal object of the present invention is to improve a lipped sealing ring that has at least one helical shoulder to the extent that compressed air can be more effectively employed to detect whether or not it is correctly positioned once installed.

This object, as well as other objects which will become apparent from the discussion that follows, are achieved in a lipped sealing ring of the aforesaid type by packing wax in the space left in the vicinity of the helical shoulder once the sealing ring has been installed. The wax prevents compressed air from escaping through the gap while the test is in progress. Incorrect installation can accordingly be detected essentially more precisely and rapidly.

When there is a series of helical shoulders or when the surface of the shoulder undulates and the crests of the undulations extend to or into the gap, each space along the circumference must be sealed with wax in the vicinity of a shoulder or of any other discontinuity in the gap due to one or the same shoulder. This approach will ensure that the interior is sealed hermetically tight while the test is in progress no matter how many shoulders there are. It will no longer be necessary to recalibrate the sensor to stop testing sealing rings with only one shoulder and to start testing sealing rings with several shoulders.

The spaces left by the helical shoulders in the vicinity of the gap can be very small in cross-section, on the order of hundredths of a square millimeter. Very little wax will accordingly be needed, although it can be added in excess without detriment to the testing procedure.

Both natural and artificial waxes have been demonstrated to be particularly practical for the present purpose. The natural waxes can be of vegetable, animal, or fossil provenance. Most waxes melt at 50 to 90 degrees C. The spaces left between the ring and the shaft in the vicinity of the helical shoulders can easily be completely packed with wax; completely, enough, that is, to provide an inner contour corresponding to an imaginary cylinder or other rotationally symmetrical surface.

Waxes adhere tightly enough to all ordinary polymers to allow the test to be conducted. Paraffin and stearin waxes are preferred. They melt at approximately 55 degrees C. Such a temperature can easily be attained or even exceeded in the vicinity of the gap as the shaft rotates in normal conditions. The wax will accordingly melt, leaving the gap subject to the hydrodynamic effects that prevail during normal operation and flowing toward the interior. The wax must not be of a type that will deleteriously affect the fluid being sealed in when they come into contact. The helical shoulder will subsequently be free of wax and entirely operable.

The present invention can be employed with helical shoulders of any type that come into contact in any way with the sealing gap. For example, the shoulders can be integrated into the sealing lip and the moving component; e.g. a rotating shaft. They can be integrated into helical grooves. The shoulders can demarcate intersecting helical ribs, grooves or cup-shaped depressions. What is important is at least one rebounding surface along the circumference of the lip to divert the flow entrained by the rotating shaft towards the interior. Prerequisite to such a surface is a graduated discontinuity—a helical shoulder, that is—in the otherwise intact annular lip. This deviation from the integrity of the circle is a necessary concomitant of leakage while the seal that does not exhibit the characteristics of the embodiment in accordance with the present invention is being tested. It is compensated for in the present invention by the wax that temporarily occupies the vicinity of the deviation.

Waxes have a doughy consistency at approximately 20 degrees C. It is accordingly unnecessary to precisely measure how much wax is applied in accordance with the present invention or to smooth it flush with the surface later. The wax will, rather, be leveled down to the surface of the shaft and ring by the weak forces normally required to position such a lip.

Another advantage of waxes is that they do not age chemically or change consistency while such a ring is being stored at room temperature to such an extent that it will be impossible to seal off the gap when a sealing ring is installed in the normal way. Waxes are accordingly simple to use.

Waxes will not intermix with oil to the detriment of its lubricating properties. They can be separated from the oil by ordinary filters.

It has been demonstrated to be of advantage for the helical shoulder to interrupt the surface of the lip that faces the moving component. The space upstream of the helical shoulder can be packed with wax while a sealing ring in accordance with the present invention is being manufactured. This approach will facilitate adhesion.

The helical shoulder or shoulders can extend at least partway around the moving component along its circumference like a coil or like segments of a circle. Especially when the lip is of PTFE, it can be of advantage to pack the space or spaces upstream of a helical shoulder or shoulders with wax in order to carry out the testing. This is probably because PTFE has a hornier consistency than rubber and is accordingly too tough for any shoulders in contact with the shaft to immediately deform enough to block upstream spaces with the elastic deformation resulting from the ordinary pressure of such a lip against the component.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
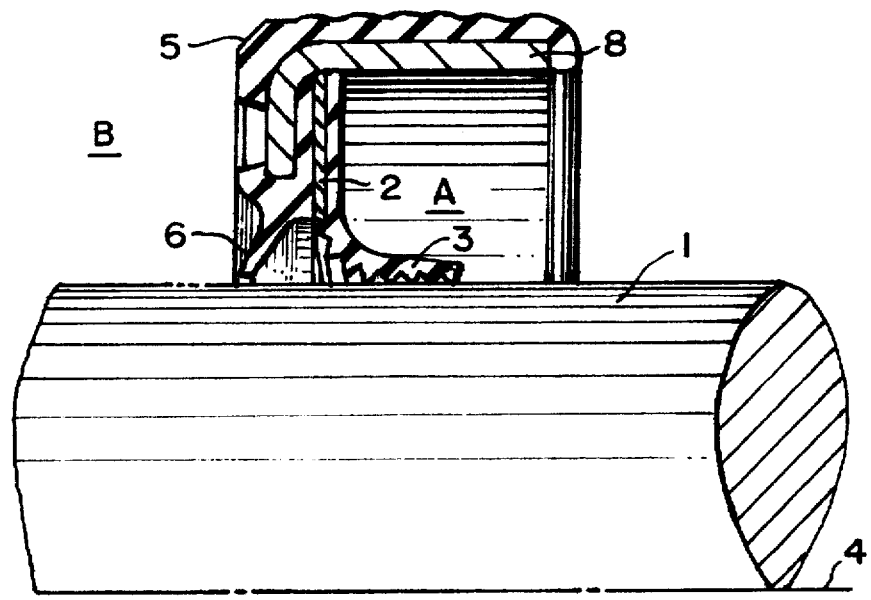
FIG. 1 is a cross-sectional view through part of a lipped sealing ring in accordance with the present invention.

The preferred embodiments of the present invention will now be described with reference to FIGS. 1 and 2 of the drawings. Identical elements in the two figures are designated with the same reference numerals.

Figure 2:
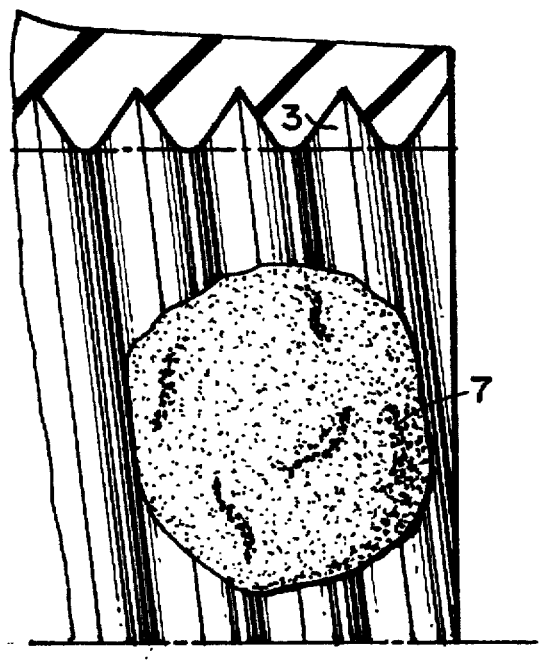
FIG. 2 is a larger scale view of part of the lip illustrated in FIG. 1 showing the wax packed region.

The lipped sealing ring illustrated in FIG. 1 is intended for sealing a mechanical component that moves relatively to it: the rotating crankshaft 1 of an internal combustion engine for example. The ring's flexible sealing lip 2 is integrated into a flat annular disk of PTFE. The disk flares out in the shape of a trumpet bell. Its narrowest point faces the interior when the machinery is in normal operation. The same surface rests against the surface of the crankshaft. The wider end of the disk is secured by cement, vulcanization, or compression for example to an annular metal reinforcement 8.

Reinforcement 8 is partly embedded in a rubber jacket 5. The jacket 5 incorporates a dust tight lip 6 that surrounds and contacts the surface of the crankshaft 1 on the side facing the outer atmosphere or exterior B. The sealing lip 2 is provided with a helical shoulder 3 in the vicinity of the sealing gap. The shoulder 3 is shaped like the thread of a screw, demarcates a helical groove, and extends all the way around the shaft. The shoulder is at an acute angle as viewed along the circumference with the axis 4 of the crankshaft 1. The slope of the shoulder 3 generates in its vicinity, as the crankshaft 1 turns, motion toward the interior A. Any leakage that escapes toward the exterior B through the sealing gap while the crankshaft 1 is at rest will accordingly be returned to the interior A once the shaft begins to rotate again.

The sealing lip 2 illustrated in FIG. 1 has only one shoulder 3 which completely surrounds the shaft 1 to be sealed in the manner of a helix. To prevent loss of pressure through the helical space—that is, the groove—upstream of the shoulder in the installed ring it is sufficient to seal the shoulder with wax 7, stearin for instance, at only one point along the shaft circumference as illustrated in FIG. 2. Obviously, the wax must be applied to a point of the helical shoulder within the sealing gap and that enough must be applied to completely occupy the free cross-section of the groove. Enough wax must accordingly be applied to completely seal off the gap. When the once-mounted lipped sealing ring is tested with compressed air, the increasing pressure in the interior will force sealing lip 2 against the crankshaft 1, increasing the tightness of the seal. No compressed gas can escape in the vicinity of the shoulder 3 either. The pressure will accordingly remain extensively constant and high, a definite indication that the ring is properly mounted.

The heat that occurs in the gap between sealing lip 2 and the rotating crankshaft 1 when the machinery is in operation as intended will melt the wax. The molten wax will be forwarded to interior A. The shoulder 3 will subsequently fully achieve its purpose, to return leaking fluid to an interior being sealed off.

If, on the other hand, the sealing ring illustrated in FIG. 1 is installed improperly, with the wrong end outside, the inner circumference of sealing lip 2 will not be forced against crankshaft 1 during the test but will be lifted off it. The air will accordingly escape very rapidly from the interior A, a definite indication that the ring is improperly mounted. The ring can accordingly be replaced before any damage occurs.

There has thus been shown and described a novel lipped sealing ring which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A lipped sealing ring for a mechanical component that moves relative to the sealing ring for retaining a liquid lubricant within a sealed space, said sealing ring comprising a lip of a polymeric material that is flexible and is forced subject to resilient compression against the component in the vicinity of a sealing gap, the lip including a helical shoulder that extends longitudinally and at an acute angle to the axis of the component through at least one point along the circumference of the gap to provide pumping action of the liquid lubricant toward the sealed space when the component is in motion, wherein the improvement comprising means for preventing compressed air from escaping from the sealed space during an initial test upon installation and prior to movement of the component, said means including a meltable wax packed in the sealing gap at least in the vicinity of the helical shoulder.

2. The sealing ring as in claim 1, wherein the helical shoulder interrupts the surface of the lip that faces the moving component.

3. The sealing ring as in claim 1, wherein the helical shoulder extends at least partway around the mechanical component; along the circumference of the component, like a coil.

4. The sealing ring as in claim 2, wherein the lip is made of PTFE.

5. The sealing ring as in claim 4, wherein the lip is shaped like the bell of a trumpet with the narrower end of the bell facing the mechanical component and the wider end of the bell secured with an annular reinforcement.

6. The sealing ring as in claim 1, wherein the helical shoulder is part of a helical groove.

* * * * *